United States Patent [19]

Hefner, Jr.

[11] Patent Number: 4,594,408

[45] Date of Patent: Jun. 10, 1986

[54] UNSATURATED POLYESTER (AMIDE)S CONTAINING THIABICYCLONONANE GROUPS

[75] Inventor: Robert E. Hefner, Jr., Lake Jackson, Tex.

[73] Assignee: The Dow Chemical Company, Midland, Mich.

[21] Appl. No.: 754,700

[22] Filed: Jul. 15, 1985

[51] Int. Cl.$^4$ .................. C08G 63/68; C08G 69/44
[52] U.S. Cl. ............................. 528/290; 525/36; 525/38; 528/291; 528/294; 528/298; 528/303; 528/306
[58] Field of Search ............... 525/36, 38; 528/290, 528/291, 294, 298, 303, 306

[56] References Cited

U.S. PATENT DOCUMENTS

| | | | |
|---|---|---|---|
| 3,288,812 | 11/1966 | LaFont et al. | 528/298 X |
| 3,347,806 | 10/1967 | Zimmermann | 528/303 X |
| 3,933,757 | 1/1976 | Pratt et al. | 528/303 X |
| 4,233,432 | 11/1980 | Curtis | 528/303 X |
| 4,471,101 | 9/1984 | Hefner et al. | 528/298 X |

Primary Examiner—Lucille M. Phynes
Attorney, Agent, or Firm—B. G. Colley

[57] ABSTRACT

Norbornyl modified unsaturated polyester and polyesteramide resins are further modified by inclusion of 9-thiabicyclononane groups. Upon curing, these resins provide shorter gel and cure times plus substantial reductions in the maximum exotherm temperature.

8 Claims, No Drawings

UNSATURATED POLYESTER (AMIDE)S CONTAINING THIABICYCLONONANE GROUPS

BACKGROUND OF THE INVENTION

This invention relates to norbornyl modified unsaturated polyester or polyesteramide resins containing 9-thiabicyclononane groups.

It is known from U.S. Pat. No. 4,410,686 that unsaturated polyesteramides can be modified and improved by the addition of norbornyl groups. It is further known from U.S. Pat. No. 3,347,806 that unsaturated polyesters can be improved by the addition of norbornyl groups.

U.S. Pat. No. 3,644,415 describes the preparation and use of non-alkylated thiabicyclononanes. The preparation and use of alkylated thiabicyclononanes is shown by Ser. No. 605,006 filed Apr. 27, 1984. However, neither this patent or this patent application suggest the use of these thiabicyclononanes in unsaturated polyesters or polyesteramides.

SUMMARY OF THE INVENTION

It now has been found that unsaturated polyester and unsaturated polyesteramide resin containing norbornyl groups can be further modified by the inclusion therein of 9-thiabicyclononane groups. The advantage of using the modified unsaturated polyester(amides) of this invention is that they have a shorter gel and cure times along with a lower exotherm upon curing. Thus, the new resins are useful to make thick castings or high build coatings where the low temperature curing characteristics provide crack-free resins. Frequently these resins also posses improved mechanical properties such as higher tensile strength and higher percent elongation.

The resins of this invention are produced by reacting the following components under resin forming conditions:

(A) an alpha, beta ethylenically unsaturated polycarboxylic acid, anhydride, or mixtures thereof, (B) about 0.05 to about 1.2 mole of dicyclopentadiene, polycyclopentadiene or a dicyclopentadiene concentrate per mole of (A), and (C) a polyol or a mixture of a polyol and a polyamine in a quantity sufficient to provide about 0.50 to about 1.075 moles of —OH, —NH$_2$ or —NHR$^1$ per mole of —COOH groups provided by (A) wherein 2 to 100 mole percent of the polyol or polyol and polyamine mixture comprises a diamino or dihydroxy thiabicyclononane or mixture thereof having one of the formulas

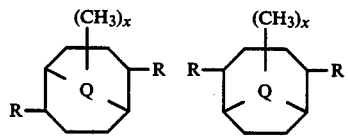

where x is 0 or 2, R is —OH, —NH$_2$, or —NHR$^1$, Q is S, SO, or SO$_2$ and R$^1$ is a hydrocarbyl group having from one to 20 carbon atoms.

DETAILED DESCRIPTION OF THE INVENTION

The $\alpha,\beta$-unsaturated polycarboxylic acid or anhydride used herein is preferably maleic acid, fumaric acid, maleic anhydride or mixtures of those compounds. These acids or anhydrides are readily available, have good reactivity with the polyol or mixture of polyol and polyamine, and result in products of good properties.

Part of the $\alpha,\beta$-unsaturated acid may be replaced with a saturated or aromatic polycarboxylic acid to vary the cross-linking potential and physical properties of the modified unsaturated polyester(amide). Such acids include the aliphatic acids such as adipic acid and the aromatic acids such as isophthalic acid. Replacement of part of the $\alpha,\beta$-unsaturated polycarboxyl acid with such acids is commonplace in the polyester art. The selection of the suitable acid and amount to achieve a desired purpose is known to the skilled worker and can be optimized with simple preliminary experiments.

The total amount of polycarboxylic acid varies as a function of the total polyol, polyamine and norbornyl functional ingredients used. The terminal group used to modify the polyester(amide) is a norbornyl radical. Dicyclopentadiene is a most preferred norbornyl functional material to be employed in terminating one or both ends of the unsaturated polyester(amide) chain. Polycyclopentadiene (i.e., DCPD oligomers) or dicyclopentadiene monoalcohol are also preferred species. Norbornene itself can also be used.

DCPD is sold commercially as a product of about 97 percent or greater percent purity. It is also sold as a C$_{10}$ hydrocarbon concentrate prepared by dimerizing a crude C$_5$ stream from the cracking of hydrocarbons as taught in U.S. Pat. No. 3,557,239. A preferred DCPD source is one that is low in peroxides and hydroperoxides and in light hydrocarbons and residual cyclopentadiene.

These concentrates have as the main reactive components about 70 to about 90 percent by weight of dicyclopentadiene, about 5 to about 30 percent by weight of the mixed Diels-Alder dimers of diolefins such as butadiene, cis-and trans-piperylene, isoprene, cyclopentadiene and methyl cyclopentadiene. The remainder of these concentrates generally comprise residual C$_5$ hydrocarbons and oligomers of the above diolefins.

Examples of some of the dimers which have been identified in these concentrates are the Diels-Alder adducts of two moles of isoprene (isoprene dimers), the adduct of cyclopentadiene and piperylene, and the like.

Either the C$_{10}$ concentrate or the relatively pure DCPD may be employed in preparing the modified unsaturated polyester(amides).

The modified unsaturated polyester(amides) can be prepared by a variety of techniques. In a preferred method, hereinafter called the "hydrolysis method," molten $\alpha,\beta$-unsaturated carboxylic anhydride is partially hydrolyzed with less than the stoichiometric equivalent of water and reacted with the norbornyl derivative to form a half ester of that derivative and containing unesterified acid and anhydride. This reaction may conveniently be performed in stages whereby reactants are added stepwise, thus controlling exotherms. That product mixture is then reacted with the polyol, polyamine if used, and diamino or dihydroxy thiabicyclononane to result in the desired modified unsaturated polyester(amide).

In a typical procedure, molten maleic anhydride and a fraction of the stoichiometric equivalent of water are maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before subsequent addition of the next increment until the desired amount of DCPD has been added.

The amount of maleic (or other) anhydride employed in this first esterification step may be equal to the equivalent of DCPD in which event the product is essentially all monoester. Alternatively, the amount of anhydride may be the equivalent needed to make the monoester plus that excess that is to be used in the subsequent ester(amidation) step.

To the mixture of DCPD monoester and acid and/or anhydride is added the polyol, polyamine, if used, and diamino or dihydroxy thiabicyclononane. That addition can be a bulk addition wherein all of the components are added in one step. The addition can be an incremental addition wherein all of the polyol and a fractional equivalent of the diamino or dihydroxy thiabicyclononane and, polyamine, if used, are added initially and allowed to react after which subsequent increments of diamino or dihydroxy thiabicyclononane and, polyamine, if used, are added. In all instances, water is continuously removed during the esteramidation step. The timing of the remaining diamino or dihydroxy thiabicyclononane and, polyamine, if used, additions can be easily determined by the amount of water removed. A convenient and practical guide is to add a diamino or dihydroxy thiabicyclononane and, polyamine, if used, increment when about one fourth to one half of the expected water from the prior addition has been collected. If a polyamine is used, incremental addition aids in the control of reaction exotherm induced by certain of the polyamines.

After addition of the polyol, polyamine, if used, and diamino or dihydroxy thiabicyclononane is complete, the reaction can be driven to maximum yield by maintaining or increasing the temperature until the desired acid number has been reached. Typically, acid numbers of 20 to 35 are preferred, although acid numbers that are somewhat higher or lower may be tolerated, and, in some instances, may be desired for certain applications.

In an equally preferred method, hereinafter called the "prehydrolysis method," molten, α,β-unsaturated polycarboxylic anhydride is essentially totally hydrolyzed with a stoichiometric or greater equivalent of water and reacted with the norbonyl derivative to form a half ester of that derivative and containing unesterified polycarboxylic acid. This reaction may conveniently be performed in stages whereby reactants are added stepwise thus controlling reaction exotherms. That product mixture is then reacted with the polyol and, polyamine, if used, and diamino or dihydroxy thiabicyclononane to result in the desired modified polyester(amide).

Many other alternate methods will be recognized by the skilled worker. For example, molten maleic anhydride may be added to a mixture of DCPD and water maintained in a reactor. The polyol, polyamine, if used, and diamino or dihydroxy thiabicyclononane are added to the mixture of DCPD monoester and acid and/or anhydride as before. Finally, although less preferred, DCPD, maleic anhydride, water, polyol, and none, all or part of the polyamine, if used, and diamino or dihydroxy thiabcyclononane may be simulataneously reacted.

The polyamines optionally used in this invention are from the class of those having the formula:

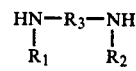

wherein $R_1$ and $R_2$ are independently selected from the group consisting of hydrogen, aliphatic, cycloaliphatic and aromatic radicals or $R_1$ and $R_2$ taken together with the remainder of the molecule form an aliphatic ring; and $R_3$ is a divalent organic radical selected from the group consisting of alkylene, ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl) polycycloalkylene.

Typical diamines that are useful herein are ethylene diamine, propylene diamine, hexane-1,6-diamine, piperazine, 4,4-methylenebis(cyclohexylamine), 2,2'-bis(4-aminocyclohexyl)propane, 4,4'-diaminodiphenyl ether, bis(aminomethyl)norbornane, toluene diamine, bis-(aminomethyl)dicyclopentadiene and homopiperazine. Typical polyamines are aminoethylpiperiazine and diethylenetriamine.

The polyols useful in this invention are from the class of those having the formula:

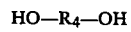

where $R_4$ is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can be used.

Representative of the useful polyols are the diols such as ethylene glycol, propylene glycol, diethylene glycol, dipropylene glycol, dicyclopentadiene dimethanol, bis(-hydroxymethyl)norbornane, methyl cyclohexanedimethanol, bis(hydroxypropyl)bisphenol A and other hydroxyalkylated bisphenols. Pentaerythritol, sorbitol glycerine and glycerin polypropoxylates are representative polyols.

When a polyamine is used, the ratio of polyamine to polyol can be varied within wide limits. That ratio is significantly related to the solubility of the modified polyesteramide in reactive diluents, such as styrene, which are commonly employed with polyesteramides for many applications. As a general rule, the amount of polyamine should not exceed about ⅓ the combined weight of the polyol and polyamine. The structure and size of the polyamine molecule will determine to a great extent the maximum amount of polyamine that can be used.

The diamino or dihydroxy thiabicyclononanes useful in this invention have one of the formulas

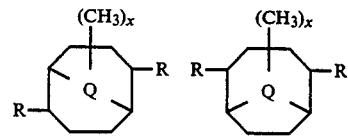

where x is 0 or 2, R is —OH, —NH$_2$, or —NHR$^1$, Q is S, SO, or SO$_2$ and R$^1$ is a hydrocarbyl group having from one to 20 carbon atoms.

The term hydrocarbyl as employed herein means any aliphatic, cycloaliphatic, aromatic aryl substituted aliphatic, or aliphatic substituted aromatic groups.

These thiabicyclononanes are known more specifically as 9-thiabicyclo[3.3.1] nonanes and 9-thiabicyclo[4.2.1] nonanes. The preparation of these compounds is set forth in U.S. Pat. No. 3,644,415 and Ser. No. 605,006 filed Apr. 27, 1984 which are incorporated by reference herein.

These compounds are blended with the polyols or mixtures of polyols and polyamines whereby 2 to 100 mole percent of the polyol or polyol and polyamine mixture is one of the thiabicyclononanes. Preferably, the mole percent used is 5 to 95 and most preferably the mole percent is 10 to 50.

As is common in the unsaturated polyester and polyesteramide art, the modified polyester(amide)s of this invention may be blended with a monomer containing polymerizable ethylenic unsaturation that is compatible therewith. Typical of the vinyl monomers are the alkenyl aromatics, such as styrene or vinyltoluene. Acrylic monomers, although less preferred, may also be used separately or in conjunction with the vinyl monomer. Typical of the acrylic monomers is dicyclopentadiene acrylate, 2-ethylhexyl acrylate and n-butyl acrylate. Other useful vinyl monomers will be known to the skilled worker. The vinyl monomer, frequently called a reactive diluent, may be employed within a wide range of concentration of from about 20 to 80 percent of diluent to about 80 to 20 percent of the resin. The optimum amount will depend in large measure on the polyester(amide), the diluent and the properties desired in the uncured and the cured states. Reactive diluents are employed principally to adjust the viscosity of a resin blend to permit its facile use in a given fabrication procedure. A coating formulation will usually require a lower viscosity than a molding formulation.

Other additives that are conventional in the polyester and polyesteramide art may also be included in formulations based upon these modified polyester(amides). Thus, fillers, pigments and other colorants, reinforcing fibers, polymers such as aliphatic polyester or polystyrene and other additives may be added to serve their intended function.

The polyesteramides and polyesters of this invention are curable by known free radical forming catalyst systems. Peroxides, such as methyl ethyl ketone peroxide, can be used with our without known promoters, such as cobalt octoate or cobalt naphthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 3.0 weight percent depending on the rate of cure desired, the magnitude of the generated exotherm and for other known purposes. Known gelation retarding agents, such as p-benzoquinone, can be employed in the curing system.

The compositions of the present invention are especially desirable for use in thick castings or high build coatings where the low temperature curing characteristics provide crack-free resins. Typical of the aforesaid applications is the preparation of large highly filled precast parts such as counter tops or sinks.

The compositions and process of the invention are illustrated in the following examples wherein all parts and percentages are by weight.

EXAMPLE 1

Polyesteramide prepared using 20 mole percent of the diol/diamine stoichiometry as dimethyl thiabicyclononane diamine Maleic anhydride (196.12 g, 2.00 mole) was added to a reactor and heated to a clear solution at 70° C. under a nitrogen atmosphere. Water (18.92 g, 1.05 mole), was added, followed by 98% dicyclopentadiene (39.67 g, 0.30 mole) two minutes later. A maximum exotherm of 105° C. resulted 15 minutes later. Additional water (6.31 g, 0.35 mole) and DCPD (39.67 g, 0.30 mole) were added to the reactor 20 minutes after the initial water addition. A third aliquot of DCPD (39.67 g, 0.30 mole) was added 15 minutes later. Fifteen minutes later, a final aliquot of DCPD (39.67 g, 0.30 mole) was added and the temperature controller was set at 110° C. This temperature was reached 8 minutes later. After 30 minutes, propylene glycol (47.49 g, 0.624 mole), diethylene glycol (66.22 g, 0.624 mole) and an isomeric mixture of dimethyl-9-thiabicyclononanediamines (62.51 g, 0.312 mole) were added to the reactor and the steam condenser was started, nitrogen sparging was increased, and the temperature controller was set at 160° C. The 160° C. temperature was reached 62 minutes later. After two hours at 160° C., the temperature controller was set at 205° C. and this temperature was achieved 18 minutes later. After 2.3 hours, a total of 39.5 mls of water layer and 3.5 mls of organic material were collected in the Dean Stark trap. The reactor was cooled to 168° C. and 100 ppm of hydroquinone was added. The polyesteramide alkyd was recovered as a clear, light yellow solid with a final acid number of 30.3.

EXAMPLE 2

Polyesteramide prepared using 10 mole percent of the diol/diamine stoichiometry as thiabicyclononane diamine Maleic anhydride (196.12 g, 2.00 mole) was added to a reactor and heated to a clear solution at 70° C. under a nitrogen atmosphere. Water (18.92 g, 1.05 mole) was added, followed by 98% dicyclopentadiene (39.67 g, 0.30 mole) two minutes later. A maximum exotherm of 104° C. resulted 17 minutes later. Additional water (6.31 g, 0.35 mole) and DCPD (39.67 g, 0.30 mole) were added to the reactor 20 minutes after the initial water addition. A third aliquot of DCPD (39.67 g, 0.30 mole) was added 15 minutes later. Fifteen minutes later, a final aliquot of DCPD (39.67 g, 0.30 mole) was added and the temperature controller was set at 110° C. This temperature was reached 6 minutes later. After 30 minutes, propylene glycol (53.42 g, 0.702 mole), diethylene glycol (74.50 g, 0.702 mole) and 9-thiabicyclo[3.3.1]nonane-2,6-diamine (26.88 g, 0.156 mole) were added to the reactor and the steam condensor was started, nitrogen sparging was increased, and the temperature controller was set at 160° C. The 160° C. temperature was reached 20 minutes later. After two hours at 160° C., the temperature controller was set at 205° C. and this temperature was achieved 20 minutes later. After 1.9 hours, a total of 40.5 mls of water layer and 9.5 mls of organic material were collected in the Dean Stark trap. The reactor was cooled to 168° C. and 100 ppm of hydroquinone was added. The polyesteramide alkyd was recovered as a clear, light yellow solid with a final acid number of 28.

CONTROL 1

DCPD modified unsaturated polyester standard Maleic anhydride (196.12 g, 2.00 mole) was added to a reactor and heated to a clear solution at 70° C. under a nitrogen atmosphere. Water (18.92 g, 105 mole) was added, followed by 98% dicyclopentadiene (39.7 g, 0.30 mole) two minutes later. A maximum exotherm of 105° C. resulted 17 minutes later. Additional water (6.31 g, 0.35 mole) and DCPD (39.67 g, 0.30 mole) were added to the reactor 20 minutes after the initial water addition. A third aliquot of DCPD (39.67 g, 0.30 mole) was added 15 minutes later. Fifteen minutes later, a final aliquot of DCPD (39.67 g, 0.30 mole) was added and the temperature controller was set at 110° C. This temperature was reached 7 minutes later. After 30 minutes, propylene glycol (59.36 g, 0.780 mole) and diethylene glycol (82.77 g, 0.780 mole) were added the reactor and the steam condensor was started, nitrogen sparging was increased, and the temperature controller was set at 160° C. The 160° C. temperature was reached 10 minutes later. After two hours at 160° C., the temperature controller was set at 205° C. and this temperature was achieved 22 minutes later. After 1.8 hours, a total of 40 mls of water layer and 9.0 mls of organic material were collected in the Dean Stark trap. The reactor was cooled to 168° C. and 100 ppm of hydroquinone was added. The polyester alkyd was recovered as a clear, pale yellow solid with a final acid number of 29.4.

EXAMPLES 3,4, AND CONTROL 2

The physical and mechanical properties of the polyesteramides and comparative polyester standard of Examples 1-2 and Control 1, respectively were determined using formulations containing 57.0% alkyd and 43.0% styrene. The heat distortion bars were cured at room temperature using 0.1% cobalt naphthenate (6%), 1.0% methylethylketone peroxide, and 0.05% dimethylaniline. The room temperature cured bars were post cured for 2.0 hours at 93° C. (200° F.). Clear, unfilled castings for use in tensile and flexural strength evaluations were made using a cure system of 1.0% benzoyl peroxide and 0.05% dimethylaniline at room temperature (25° C.), followed by post curing for 2.0 hours at 93° C. (200° F.). Heat distortion temperature, tensile and flexural strength tests were completed using an Instron machine with standard methods (ASTM D-648, D-638 and D-790, respectively). The Barcol hardness value is on the 934-1 scale. The data is summarized in Table I.

The polyesteramides of Table I possess significantly improved tensile strength and percent elongation over that of the comparative polyester standard of Control 1. These polyesteramides possess unique SPI gel and cure characteristics in that the gel and cure times are significantly shorter than those of the polyester standard and, unexpectedly, the maximum exotherm upon curing is dramatically decreased. These unique cure properties likely accrue from the presence of the sulfur bridge and may lead to use of these polymers in fast gel systems such as thick castings or high build coatings where the low temperature curing characteristics provide crack-free resins.

EXAMPLE 5

Polyester prepared using 10.26 mole percent of the diol stoichiometry as thiabicyclononane diol Maleic anhydride (196.12 g, 2.00 mole) was added to a reactor and heated to a clear solution at 70° C. under a nitrogen atmosphere. Water (18.92 g, 1.05 mole) was added, followed by dicyclopentadiene concentrate (39.87 g, 0.30 mole of reactives two minutes later. The dicyclopentadiene concentrate contained 0.52% lights, 16.84% cyclopentadiene codimers and diolefin dimers, 82.60% dicyclopentadiene and 0.04% trimers. A maximum exotherm of 104° C. resulted 15 minutes later. Additional water (6.31 g, 0.35 mole) and DCPD (39.87 g, 0.30 mole of reactives) were added to the reactor 20 minutes after the initial water addition. A third aliquot of DCPD (39.87 g, 0.30 mole of reactives) was added 15 minutes later. Fifteen minutes later, a final aliquot of DCPD (39.87 g, 0.30 mole of reactives) was added and the temperature controller was set at 110° C. This temperature was reached 10 minutes later. After 30 minutes, propylene glycol (106.84 g, 1.40 mole) and 9-thiabicyclo[3.3.1]nonane-2,6-diol (27.8 g, 0.160 mole) were added to the reactor and the steam condensor was started, nitrogen sparging was increased, and the temperature controller was set at 160° C. The 160° C. temperature was reached 22 minutes later. After two hours at 160° C., the temperature controller was set at 205° C. and this temperature was achieved 8 minutes later. After 2.47 hours, a total of 49 mls of water layer and 9.0 mls of organic material were collected in the Dean Stark trap. The reactor was cooled to 164° C. and 100 ppm of hydroquinone was added. The polyester alkyd was recovered as a clear, light amber solid with a final acid number of 28.1.

CONTROL 3

DCPD modified unsaturated polyester standard prepared using DCPD concentrate

Maleic anhydride (196.12 g, 2.00 mole) was added to a reactor and heated to a clear solution at 70° C. under a nitrogen atmosphere. Water (18.92 g, 1.05 mole) was added, followed by dicyclopentadiene concentrate (39.87 g, 0.30 mole of reactives) two minutes later. A maximum exotherm of 105° C. resulted 15 minutes later. Additional water (6.31 g, 0.35 mole) and DCPD (39.87 g, 0.30 mole of reactives) were added to the reactor 20 minutes after the initial water addition. A third aliquot of DCPD (39.87 g, 0.30 mole of reactives) was added 15 minutes later. Fifteen minutes later, a final aliquot of DCPD (39.87 g, 0.30 mole of reactives) was added and the temperature controller was set at 110° C. This temperature was reached 13 minutes later. After 30 minutes, propylene glycol (118.72 g, 1.50 mole) was added to the reactor and the steam condensor was started, nitrogen sparging was increased, and the temperature controller was set at 160° C. The 160° C. temperature was reached 16 minutes later. After two hours at 160° C., the temperature controller was set at 205° C. and this temperature was achieved 20 minutes later. After 2.3 hours, a total of 41.5 mls of water layer and 11.0 mls of organic material were collected in the Dean Stark trap. The reactor was cooled to 164° C. and 100 ppm of hydroquinone was added. The polyester alkyd was recovered as a clear, light yellow solid with a final acid number of 34.7.

CONTROL 4

Polyester prepared using 10.26 mole percent of the diol stoichiometry as 1,5-cyclooctanediol Maleic anhydride (196.12 g, 2.00 mole) was added to a reactor and heated to a clear solution at 70° C. under a nitrogen atmosphere. Water (18.92 g, 1.05 mole) was added, followed by dicyclopentadiene concentrate (39.87 g, 0.30 mole of reactives) two minutes later. The dicyclopentadiene concentrate contained 0.52% lights, 16.84% cyclopentadiene codimers and diolefin dimers, 82.60% dicyclopentadiene and 0.04% trimers. A maximum exotherm of 105° C. resulted 16 minutes later. Additional water (6.31 g, 0.35 mole) and DCPD (39.87 g, 0.30 mole of reactives) were added to the reactor 20 minutes after the initial water addition. A third aliquot of DCPD (39.87 g, 0.30 mole of reactives) was added 15 minutes later. Fifteen minutes later, a final aliquot of DCPD (39.87 g, 0.30 mole of reactives) was added and the temperature controller was set at 110° C.

This temperature was reached 8 minutes later. After 30 minutes, propylene glycol (106.84 g, 1.40 mole) and 1,5-cyclooctanediol (22.50 g, 0.160 mole) were added to the reactor and the steam condensor was started, nitrogen sparging was increased, and the temperature controller was set at 160° C. The 160° C. temperature was reached 26 minutes later. After two hours at 160° C., the temperature controller was set at 205° C. and this temperature was achieved 8 minutes later. After 2.47 hours, a total of 48 mls of water layer and 8.5 mls of organic material were collected in the Dean Stark trap. The reactor was cooled to 164° C. and 100 ppm of hydroquinone was added. The polyester alkyd was recovered as a clear, light amber solid with a final acid number of 29.0.

EXAMPLE 6 AND CONTROLS 5 AND 6

The physical and mechanical properties of the polyesters of Example 5 and Controls 3 and 4 were determined using formulations of 57.0% alkyd and 43.0% styrene and the methods described in Examples 3, 4 and Control 2. The data is summarized in Table II.

The 9-thiabicyclononane diol modified polyester of Table II again possesses better tensile strength, improved percent elongation, and fast gel time with low temperature curing when compared to the polyester standard. Furthermore, the 9-thiabicyclononane diol modified polyester of Table II possesses better tensile strength, improved percent elongation and faster gel time with low temperature curing when compared to the polyester prepared using a cyclooctane diol (no sulfur bridge).

TABLE I

| Example No. | Brookfield Viscosity 25° C. (cp) | HDT* (°C.) | SPI Gel - 84° C. | | | Average Barcol Hardness | Tensile Strength (psi) | Elongation (%) | Flexural Strength (psi) |
| | | | Gel Time (min) | Cure Time (min) | Maximum Exotherm (°C.) | | | | |
|---|---|---|---|---|---|---|---|---|---|
| Ex. 3 | 912.5 | 86 | 2.2 | 4.4 | 100 | 41 | 6.189 | 2.22 | 12,160 |
| Ex. 4 | 160 | 91 | 3.1 | 6.4 | 112 | 28 | 7.072 | 2.92 | 9,083 |
| Control 2** | 36.5 | 92 | 4.5 | 7.1 | 217 | 48 | 5.434 | 1.54 | 10,805 |

*heat distortion temperature
**not an embodiment of the invention

TABLE II

| Example No. | Brookfield Viscosity (cp) | HDT (°C.) | SPI GEL - 84° C. | | | Average Barcol Hardness | Tensile Strength (psi) | Elongation (%) | Flexural Strength (psi) |
| | | | Gel Time (min) | Cure Time (min) | Maximum Exotherm (°C.) | | | | |
|---|---|---|---|---|---|---|---|---|---|
| Ex. 6 | 81 | 102 | 2.75 | 6.3 | 121 | 42 | 4,483 | 1.60 | 12,076 |
| Control 5** | 60.5 | 111 | 3.4 | 4.8 | 195 | 52 | 3,113 | 0.71 | 9,951 |
| Control 6** | 92 | 103 | 3.7 | 5.1 | 191 | 44 | 3,721 | 1.20 | 10,814 |

**not an embodiment of the invention

EXAMPLE 7

Polyesteramide prepared using 5.0 mole percent of the diol/diamine stoichiometry as dimethyl thiabicyclononane diamine Maleic anhydride (196.12 grams, 2.00 moles) was added to a reactor and heated to a clear solution at 70° C. under a nitrogen atmosphere. Water (18.92 grams, 1.05 mole) was added, followed by 98% dicyclopentadiene (39.67 grams, 0.30 mole) two minutes later. A maximum exotherm of 105° C. resulted 14 minutes later. Additional water (6.31 grams, 0.35 mole) and dicyclopentadiene (39.67 grams, 0.30 mole) were added to the reactor 20 minutes after the initial water addition. A third aliquot of dicyclopentadiene (39.67 grams, 0.30 mole) was added 15 minutes later. Fifteen minutes later, a final aliquot of dicyclopentadiene (39.67 grams, 0.30 mole) was added and the temperature controller was set at 110° C. This temperature was reached 6 minutes later. After 30 minutes, propylene glycol (56.39 grams, 0.741 mole), diethylene glycol (78.64 grams, 0.741 mole) and an isomeric mixture of dimethyl-9-thiabicyclononanediamines (15.63 grams, 0.078 mole) were added to the reactor and the steam condensor was started, nitrogen sparging was increased to 0.5 liter per minute, and the temperature controller was set at 160° C. The 160° C. temperature was reached 22 minutes later. After two hours at 160° C., the temperature controller was set at 205° C. and this temperature was achieved 16 minutes later. After 2.1 hours, a total of 48 milliliters of water layer and 3 milliliters of organic material were collected in the Dean Stark trap. The reactor was cooled to 168° C. and 100 ppm of hydroquinone was added. The polyesteramide alkyd was recovered as a transparent, light yellow colored tacky solid with a final acid number of 27.8. A portion of the polyesteramide alkyd (142.5 grams) was formulated with styrene (107.5 grams) and this solution was used to prepare a clear, unfilled ⅛ inch casting using the method of Examples 3,4 and Control 2. The physical and mechanical properties were determined using the method of Examples 3,4 and Control 2. The results are reported in Table III.

TABLE III

|  | Example 7 |
|---|---|
| Brookfield Viscosity 250° C. (cp) | 53 |
| SPI Gel (84° C.) | |
| Gel time (min.) | 3.6 |
| Cure time (min.) | 7.2 |
| Maximum exotherm (°C.) | 189 |
| Average Barcol Hardness | 32 |
| Tensile Strength (psi) | 8227 |
| Elongation (%) | 3.19 |
| Flexural Strength (psi) | 15,325 |
| Flexural Modulus (psi) | 402,000 |

I claim:

1. A norbornyl modified unsaturated polyester or polyesteramide resin produced by reacting under resin forming conditions
   (A) an alpha, beta ethylenically unsaturated polycarboxylic acid, anhydride, or mixtures thereof,
   (B) about 0.05 to about 1.2 mole of dicyclopentadiene, polycyclopentadiene or a dicyclopentadiene concentrate per mole of (A), and
   (C) a polyol or a mixture of a polyol and a polyamine in a quantity sufficient to provide about 0.50 to about 1.075 moles of —OH, —NH$_2$ or —NHR$^1$ groups per mole of —COOH groups provided by (A) wherein 2 to 100 mole percent of the polyol or polyol and polyamine mixture comprises a diamino or dihydroxy thiabicyclononane or mixture thereof having one of the formulas

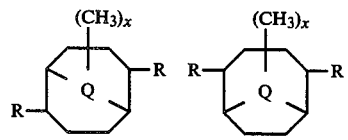

where x is 0 or 2, R is —OH, —NH$_2$, or —NHR$^1$, Q is S, SO, or SO$_2$ and R$^1$ is a hydrocarbyl group having from one to 20 carbon atoms.

2. The unsaturated polyester or polyesteramide resin of claim 1 wherein 5 to 95 mole percent of said polyol is a thiabicyclononane of the given formulas.

3. The unsaturated polyester or polyesteramide of claim 1 wherein 10 to 50 mole percent of said polyol is a thiabicyclononane of the given formulas.

4. An unsaturated polyester resin produced by reacting under resin forming conditions
   (A) an alpha, beta ethylenically unsaturated polycarboxylic acid, anhydride, or mixtures thereof,
   (B) about 0.05 to about 1.2 mole of dicyclopentadiene, polycyclopentadiene or a dicyclopentadiene concentrate per mole of (A), and
   (C) a polyol in a quantity sufficient to provide about 0.50 to about 1.075 moles of —OH, —NH$_2$ or —NHR$^1$ groups per mole of —COOH groups provided by (A) wherein 2 to 100 mole percent of the polyol comprises a dihydroxy thiabicyclononane or a mixture thereof having one of the formulas

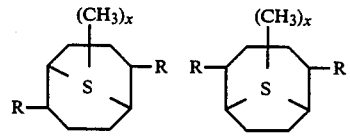

where x is 0 or 2, and R is —OH.

5. A unsaturated polyesteramide resin produced by reacting under resin forming conditions
   (A) an alpha, beta ethylenically unsaturated polycarboxylic acid, anhydride, or mixtures thereof,
   (B) about 0.05 to about 1.2 mole of dicyclopentadiene, polycyclopentadiene or a dicyclopentadiene concentrate per mole of (A), and
   (C) a polyol or a mixture of a polyol and a polyamine in a quantity sufficient to provide about 0.50 to about 1.075 moles of —OH, —NH$_2$ or —NHR$^1$ groups per mole of —COOH groups provided by (A) wherein 2 to 100 mole percent of the polyol and polyamine mixture comprises a diamino thiabicyclononane or a mixture thereof having one of the formulas

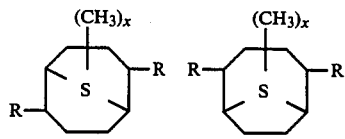

where x is 0 or 2, R is —NH$_2$, or —NHR$^1$, and R$^1$ is a hydrocarbyl group having from one to 20 carbon atoms.

6. A curable polyester or polyesteramide blend which comprises one of the resins of claims 1-5 blended with a polymerizable ethylenically unsaturated monomer.

7. The blend of claim 6 wherein said ethylenically unsaturated monomer is styrene.

8. The cured polyester or polyesteramide blend set forth in claim 6.

* * * * *